United States Patent
Jiang et al.

(10) Patent No.: US 12,316,032 B2
(45) Date of Patent: May 27, 2025

(54) DUAL-FREQUENCY AND DUAL-CIRCULARLY-POLARIZED TRANSMIT-ARRAY ANTENNA WITH INDEPENDENTLY CONTROLLABLE BEAMS

(71) Applicant: Southeast University, Jiangsu (CN)

(72) Inventors: Zhihao Jiang, Jiangsu (CN); Xuanfeng Tong, Jiangsu (CN); Wei Hong, Jiangsu (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 328 days.

(21) Appl. No.: 18/177,610

(22) Filed: Mar. 2, 2023

(65) Prior Publication Data
US 2023/0378652 A1    Nov. 23, 2023

(30) Foreign Application Priority Data
May 19, 2022    (CN) .......................... 202210544697.3

(51) Int. Cl.
*H01Q 9/04*      (2006.01)
*H01Q 13/20*     (2006.01)
*H01Q 21/06*     (2006.01)

(52) U.S. Cl.
CPC ......... *H01Q 9/0428* (2013.01); *H01Q 13/206* (2013.01); *H01Q 21/065* (2013.01)

(58) Field of Classification Search
CPC ... H01Q 9/0428; H01Q 13/206; H01Q 21/065
See application file for complete search history.

(56) References Cited

FOREIGN PATENT DOCUMENTS

| CN | 1382314 A | * | 11/2002 | ............... H01Q 1/36 |
| CN | 112952404 A | | 6/2011 | |
| CN | 113078477 A | | 7/2021 | |

* cited by examiner

*Primary Examiner* — Henry Luong
(74) *Attorney, Agent, or Firm* — MUNCY, GEISSLER, OLDS & LOWE, P.C.

(57) ABSTRACT

A dual-frequency and dual-circularly-polarized transmit-array antenna with independently controllable beams includes a planar broadband circularly polarized feed array and a planar transmit-array, the planar broadband circularly polarized feed array being placed near a focal plane of the planar transmit-array. The planar broadband circularly polarized feed array includes K-band left/right-handed circularly polarized feeds and Ka-band left/right-handed circularly polarized feeds that are integrated in the same plane. The planar transmit-array includes K-band and Ka-band dual-circularly-polarized phase shifting cells that are periodically staggered in a shared-aperture manner and based on an architecture of receiving antenna-phase shifting stripline-transmitting antenna. The antenna realize independent adjustment of right-handed and left-handed circularly polarized transmit phases in the K-band and the Ka-band, and it possesses the advantages such as miniaturization, low profile, and easy integration, and so on, thus having significant application prospects in fields such as satellite communications.

21 Claims, 10 Drawing Sheets

DUAL-FREQUENCY AND DUAL-CIRCULARLY-POLARIZED TRANSMIT-ARRAY ANTENNA WITH INDEPENDENTLY CONTROLLABLE BEAMS

TECHNICAL FIELD

The present invention relates to the field of electronic devices in a wireless communication system, and more particularly to a dual-frequency and dual-circularly-polarized transmit-array antenna with independently controllable beams.

BACKGROUND

Because next-generation wireless communication systems are no longer limited to inter-terrestrial communication, the process of integrated communication between space, air and ground has become an inevitable trend and satellite communication technology plays an indispensable role in this process. Compared to the low-frequency satellite communication in the X-band or Ku-band, Ka/K-band satellite communication attracts more and more attention because of its broadband, high gain, small size and other advantages. Because linearly polarized waves operating in the Ka/K-band will be affected when they passing through the ionosphere, the antenna with circular polarization characteristics is usually required. Therefore, designing a dual-frequency and dual-circularly-polarized antenna that meets the satellite uplink and downlink communication requirements has become an inevitable trend.

From the reported works, there are few antennas which can meet the dual-frequency and dual-circular-polarized requirements described above. Reflect-array/transmit-array antennas are usually employed to achieve multi-frequency and multi-polarization characteristics due to their advantages such as a planar structure, high gain, and simple processing. The reflect-array/transmit-array antennas are all evolved from the corresponding classic metallic reflectors and curved dielectric lenses. By a reasonable arrangement of phase modulation cells on an aperture, the reflect-array/transmit-array antenna can convert the spherical waves emitting from a feeding sources to uniform plane waves with a high gain. Three types of dual-frequency and dual-circularly-polarized reflect-array antennas have been reported in the existing documents. The first type is implemented based on a single functional layer, that is, a dual-frequency and dual-circularly-polarized reflect-array in a single functional layer is implemented by combining dynamic phase modulation and rotational phase modulation, and by a shared-aperture arrangement. The second type is implemented based on double functional layers, that is, a dual-frequency and dual-circularly-polarized reflect-array is implemented by means of a dual-frequency dual-linearly polarized reflect-array functional layer placed at the bottom and a dual-frequency linearly and circularly polarized converter functional layer placed at the top. The third type is implemented based on three functional layers, namely, a Ku-band dual-circularly-polarized reflect-array functional layer placed at the bottom, a Ka-band dual-circularly-polarized reflect-array functional layer placed at the top, and a frequency-selective surface functional layer placed in the middle for separating two frequency bands.

Compared to the reflect-array antenna, the transmit-array antenna does not have the problem of feed blockage and thus can better serve satellite communications. At present, relevant documents have reported dual-frequency transmit-array antennas and dual-circularly-polarized transmit-array antennas. In most cases, the dual-frequency transmit-array antennas are implemented based on shared-aperture arrangement of dual-frequency cells. The dual-circularly-polarized transmit-array antennas are implemented based on a dual-linearly-polarized transmit-array and a linearly-to-circularly polarized converter, and a combination of dynamic phase modulation and rotational phase modulation. However, in order to meet the need for high-throughput satellite communications, it is necessary to conduct an in-depth study for the dual-frequency and dual-circularly-polarized transmit-array antenna.

SUMMARY

Technical objective: For the need for high-throughput satellite communications, the present invention discloses a dual-frequency and dual-circularly-polarized transmit-array antenna with independently controllable beams for satisfying the requirements of high-throughput satellite communication systems. where the transmit-array antenna has advantages such as a low profile and a small spacing between cells; and can provide functions of dual frequency and dual circular polarization, low axial ratio, high gain, and independently controllable beam pointing.

Technical solution: To achieve the foregoing technical objective described above, the present invention adopts the following technical solutions:

A dual-frequency and dual-circularly-polarized transmit-array antenna with independently controllable beams, including: a planar broadband circularly polarized feed array and a planar transmit-array that are disposed in parallel to each other, where the planar broadband circularly polarized feed array includes a K-band left-handed circularly polarized feed antenna, a K-band right-handed circularly polarized feed antenna, a Ka-band left-handed circularly polarized feed antenna, and a Ka-band right-handed circularly polarized feed antenna that are disposed in the same plane.

Preferably, the K-band left-handed circularly polarized feed antenna, the K-band right-handed circularly polarized feed antenna, the Ka-band left-handed circularly polarized feed antenna, and the Ka-band right-handed circularly polarized feed antenna are each a broadband circularly polarized antenna constructed in a form of a microstrip line slot coupled stacked patch, and are integrated in the same planar feed array.

Preferably, the K-band left-handed circularly polarized feed antenna, the K-band right-handed circularly polarized feed antenna, the Ka-band left-handed circularly polarized feed antenna, and the Ka-band right-handed circularly polarized feed antenna each have four metal layers, which are a feed microstrip circuit layer, a feed metal ground plane layer, a first feed notched circular patch layer, and a second feed notched circular patch layer from bottom to top.

Preferably, the feed microstrip circuit layer includes one input port and four output ports formed by connection of the microstrip lines, and a −90-degree phase difference required for left-handed circular polarization or a 90-degree phase difference required for right-handed circular polarization is formed between the four output ports; the feed metal ground plane layer is provided with four gaps rotating 90 degrees in sequence and having the same shape; and the first feed notched circular patch layer and the second feed notched circular patch layer are each provided with four notched circular patches rotating 90 degrees in sequence.

Preferably, the first feed notched circular patch layer and the second feed notched circular patch layer are provided with one of a notched circular patch and a notched rectangular patch; and the four gaps on the feed metal ground plane layer are in any one of a straight line shape, an H shape, a cross shape, a Z shape, and an oval shape.

Preferably, the planar broadband circularly polarized feed array further includes three substrate layers, the three substrate layers being respectively a first feed substrate layer, a second feed substrate layer, and a third feed substrate layer; the feed microstrip circuit layer being disposed below the first feed substrate layer, the feed metal ground plane layer being disposed above the first feed substrate layer, the first feed notched circular patch layer being disposed above the second feed substrate layer, and the first feed notched circular patch layer being disposed below the third feed substrate layer.

Preferably, the planar broadband circularly polarized feed array further includes a feed adhesive layer and a feed air layer, the feed adhesive layer being disposed between the first feed substrate layer and the second feed substrate layer, and the feed adhesive layer or the feed air layer being disposed between the second feed substrate layer and the third feed substrate layer.

Preferably, the planar transmit-array includes a plurality of K-band dual-circularly-polarized phase shifting cells and a plurality of Ka-band dual-circularly-polarized phase shifting cells that are periodically staggered in a shared-aperture manner.

Preferably, the K-band dual-circularly-polarized phase shifting cells are two-dimensionally periodically arranged on the vertices of square grids with a side length of a K-band period length, and the Ka-band dual-circularly-polarized phase shifting cells are two-dimensionally periodically arranged on center points of square grids with a side length of the K-band period length; and the period length of the K-band dual-circularly-polarized phase shifting cell is 0.3 to 0.5 K-band wavelength, and the period length of the Ka-band dual-circularly-polarized phase shifting cell is 0.5 to 0.8 Ka-band wavelength.

Preferably, the K-band dual-circularly-polarized phase shifting cell and the Ka-band dual-circularly-polarized phase shifting cell each include a receiving antenna, a phase shifting stripline, and a transmitting antenna, the receiving antenna and the transmitting antenna being connected via the phase shifting stripline.

Preferably, the K-band dual-circularly-polarized phase shifting cell and the Ka-band dual-circularly-polarized phase shifting cell each use a manner of x-linearly polarized receiving and y-linearly polarized transmit, or y-linearly polarized receiving and x-linearly polarized transmit, phase shifting degrees in x-linearly polarized receiving and y-linearly polarized transmit, and y-linearly polarized receiving and x-linearly polarized transmit being consistent.

Preferably, the K-band dual-circularly-polarized phase shifting cell includes several metal layers disposed from bottom to top, the metal layers forming the receiving antenna, the phase shifting stripline, and the transmitting antenna of the K-band dual-circularly-polarized phase shifting cell;

and by setting a phase shifting degree of the metal layer for the phase shifting stripline of the K-band dual-circularly-polarized phase shifting cell, linearly polarized transmit phases corresponding to four K-band dual-circularly-polarized phase shifting cells in the planar transmit-array are set to have a 45-degree difference between adjacent cells.

Preferably, the K-band dual-circularly-polarized phase shifting cell includes a K-band first metal layer, a K-band fourth metal layer, a K-band fifth metal layer, a K-band sixth metal layer, a K-band seventh metal layer, a K-band eighth metal layer, and a K-band eleventh metal layer that are disposed from bottom to top;

and several K-band metal vias are arranged to respectively connect the K-band fourth metal layer to the K-band sixth metal layer, the K-band fifth metal layer to the K-band seventh metal layer, and the K-band sixth metal layer to the K-band eighth metal layer.

Preferably, the K-band first metal layer and the K-band eleventh metal layer of the K-band dual-circularly-polarized phase shifting cell each are disposed in one of a notched circular patch and a notched rectangular patch.

Preferably, the K-band first metal layer and the K-band eleventh metal layer are each a circular patch provided with ±45 degree notches, the K-band fourth metal layer and the K-band eighth metal layer are each orthogonal L-shaped microstrip lines, the K-band fifth metal layer and the K-band seventh metal layer are each a metal ground plane provided with two circular holes, and the K-band sixth metal layer is formed by two phase shifting striplines.

Preferably, the Ka-band dual-circularly-polarized phase shifting cell includes several metal layers, the metal layers forming the receiving antenna, the phase shifting stripline, and the transmitting antenna of the Ka-band dual-circularly-polarized phase shifting cell; and by setting a phase shifting degree of the metal layer for the phase shifting stripline of the Ka-band dual-circularly-polarized phase shifting cell, linearly polarized transmit phases corresponding to four Ka-band dual-circularly-polarized phase shifting cells in the planar transmit-array are set to have a 45-degree difference between adjacent cells.

Preferably, the Ka-band dual-circularly-polarized phase shifting cell includes a Ka-band first metal layer, a Ka-band third metal layer, a Ka-band fourth metal layer, a Ka-band fifth metal layer, a Ka-band sixth metal layer, a Ka-band seventh metal layer, and a Ka-band ninth metal layer that are disposed from bottom to top;

and several Ka-band metal vias are arranged to respectively connect the Ka-band third metal layer to the Ka-band fifth metal layer, the Ka-band fourth metal layer to the Ka-band sixth metal layer, and the Ka-band fifth metal layer to the Ka-band seventh metal layer.

Preferably, the Ka-band first metal layer and the Ka-band ninth metal layer of the Ka-band dual-circularly-polarized phase shifting cell each are disposed in one of a notched circular patch and a notched rectangular patch.

Preferably, the Ka-band first metal layer and the Ka-band ninth metal layer are each a circular patch provided with ±45 degree notches, the Ka-band third metal layer and the Ka-band seventh metal layer are each orthogonal L-shaped microstrip lines, the Ka-band fourth metal layer and the Ka-band sixth metal layer are each a metal ground plane provided with two circular holes, and the Ka-band fifth metal layer is formed by two phase shifting striplines.

Preferably, the planar transmit-array includes several substrate layers and adhesive layers, the adhesive layer being disposed between adjacent substrate layers, and each metal layer being disposed above or below the substrate layer in a stacked patch form.

Preferably, the planar broadband circularly polarized feed array is placed near a focal plane of the planar transmit-array in a vertical distance from the planar transmit-array of F, and the planar transmit-array has a diameter of D, where $0.3 \leq F/D \leq 1.5$.

Advantageous effects: Compared to the prior art, the present invention provides a dual-frequency and dual-circularly-polarized transmit-array antenna with independently controllable beams, which has the following advantages:

(1) The present invention integrates the required K-band left-handed circularly polarized feed, K-band right-handed circularly polarized feed, Ka-band left-handed circularly polarized feed, and Ka-band right-handed circularly polarized feed in the same planar feed array. Thus, dual-frequency and dual-circular-polarized performance is achieved without the need for frequent replacement of the feed and with reduced overall profile of the transmit-array antenna.

(2) The receiving antenna and the transmitting antenna of the K-band dual-circularly-polarized phase shifting cell proposed by the present invention have the same antenna form, simplifying the design of the transmit-array antenna. Further, the broadband and miniaturization performance of the antenna is achieved by using stacked patches and bent patches. The receiving antenna and the transmitting antenna of the proposed Ka-band dual-circularly-polarized phase shifting cell also share the same antenna form, and the miniaturization characteristic of the antenna is achieved by bending the circular patches of the antenna.

(3) The K-band dual-circularly-polarized phase shifting cells and the Ka-band dual-circularly-polarized phase shifting cell proposed by the present invention both use a manner of x(y)-linearly polarized receiving and y(x)-linearly polarized transmitting. Therefore, the phase shifting striplines in the two optical axes of the cell do not need to differ by 180 degrees, and the dispersion problem is avoided accordingly. In this way, the designed K-band and Ka-band dual-circularly-polarized phase shifting cells both have the broadband phase shifting characteristic.

(4) By combining dynamic phase change and rotational phase change, the present invention enables independent modulation of the left-handed circularly polarized transmit phase and the right-handed circularly polarized transmit phase in both the K-band and the Ka-band, thus making the dual-frequency and dual-circularly-polarized beams independently controllable.

(5) The transmit-array antenna proposed in the present invention uses a single-functional layer structure, and has the advantages of low profile and easy integration. The profile of the transmit-array is only $0.18\lambda_K$, where $\lambda_K$ is the free-space wavelength at K-band. Compared to the existing single-frequency dual-circularly-polarized or dual-frequency single-circularly-polarized transmit-array antennas with double functional layers, the profile is reduced by nearly 88% and the bandwidth is wider.

Figure 1:
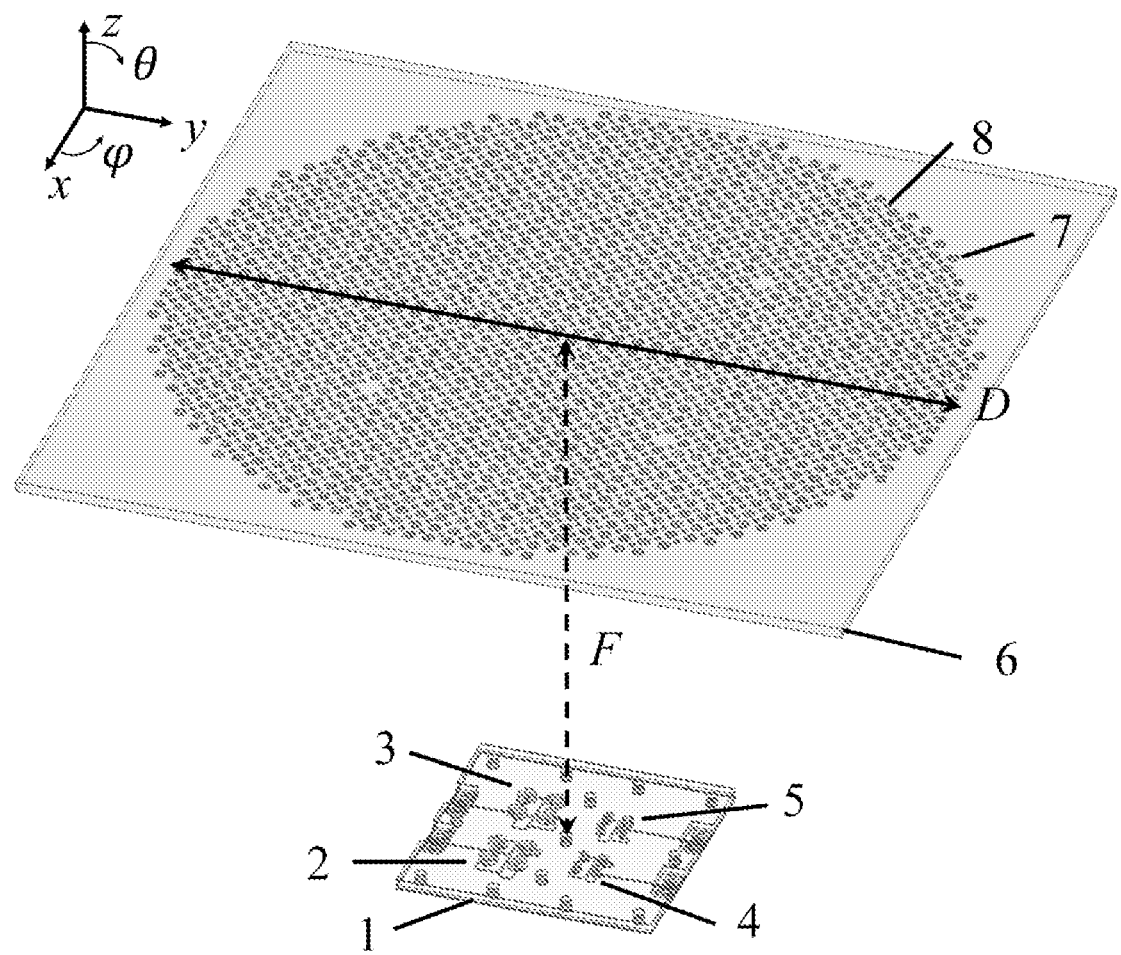
FIG. 1 is a schematic three-dimensional diagram of a dual-frequency and dual-circularly-polarized transmit-array antenna with independently controllable beams provided by the present invention.
Figure 6:
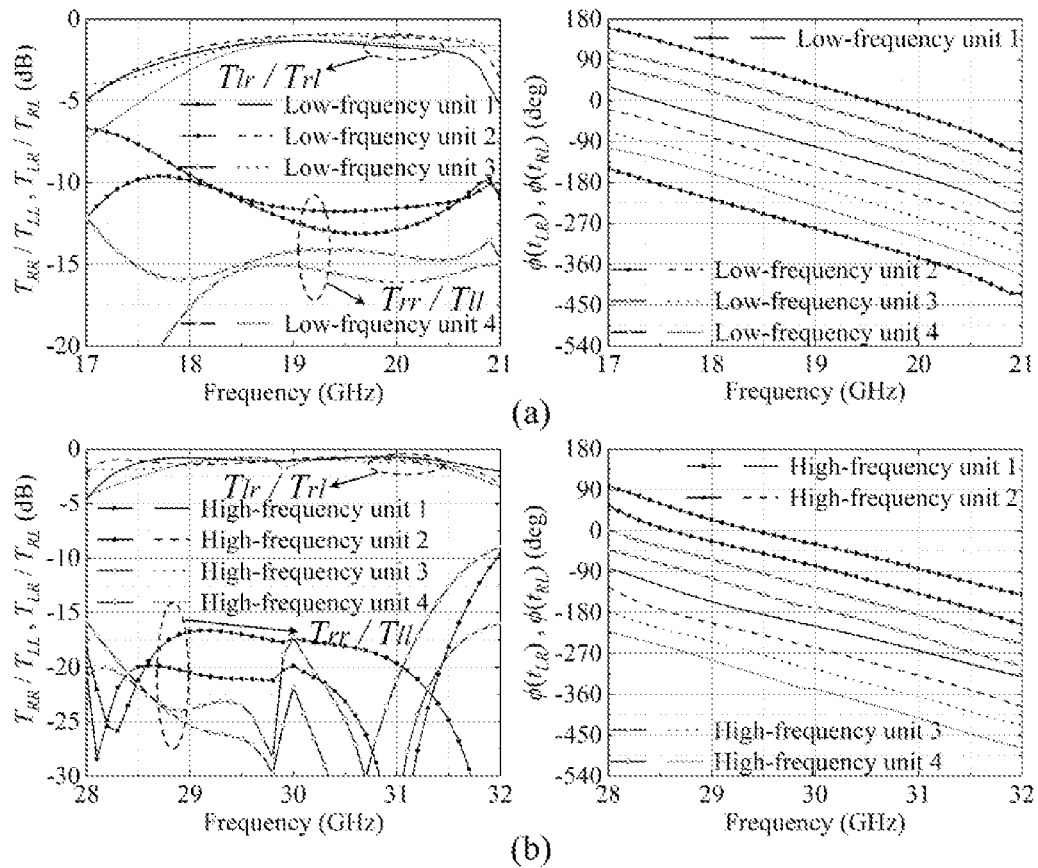
Figure 7:
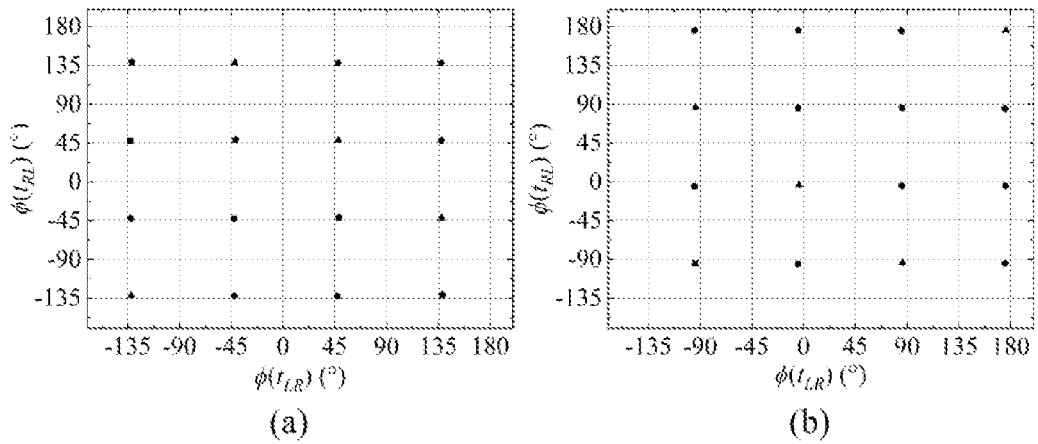
Figure 8:
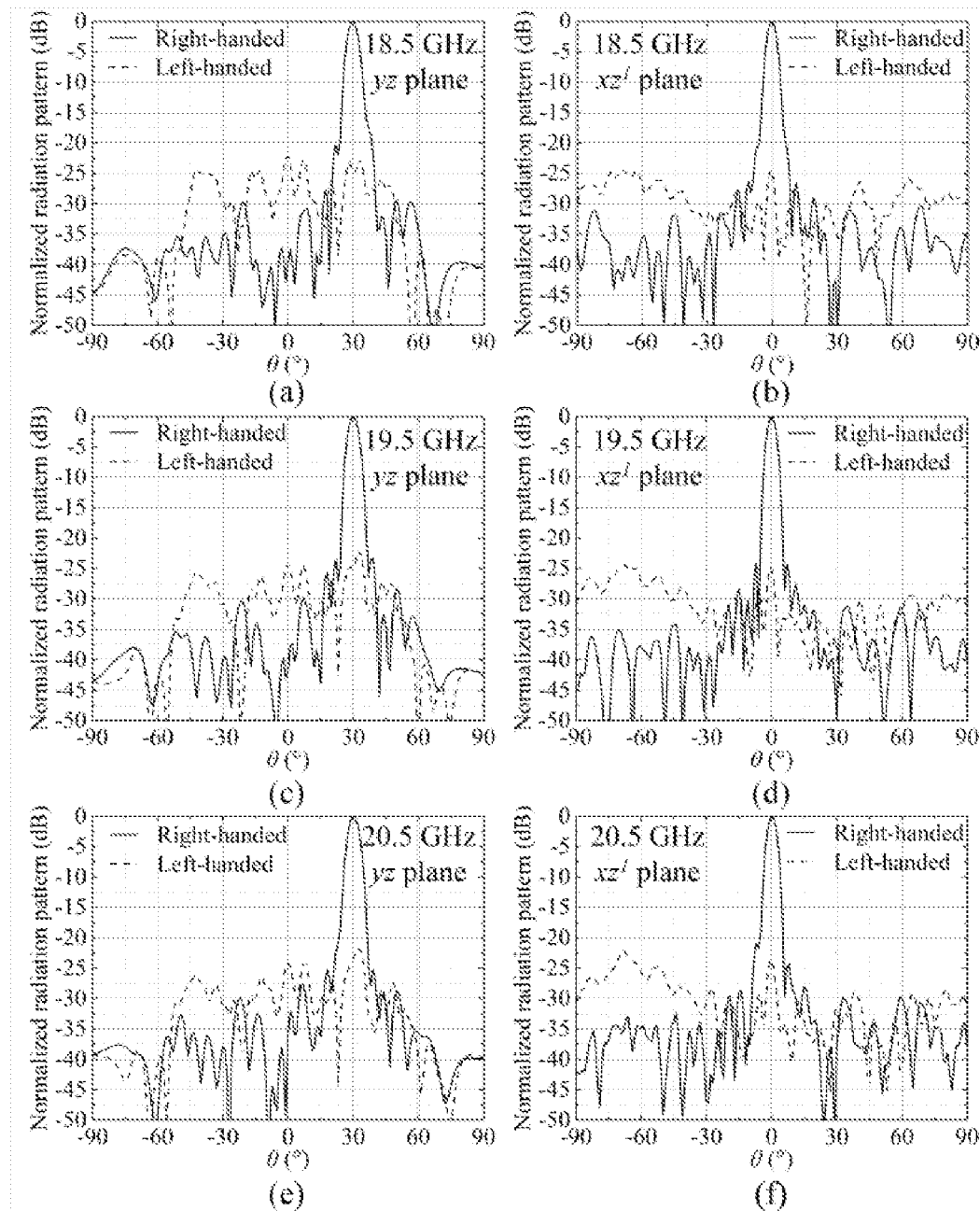
Figure 9:
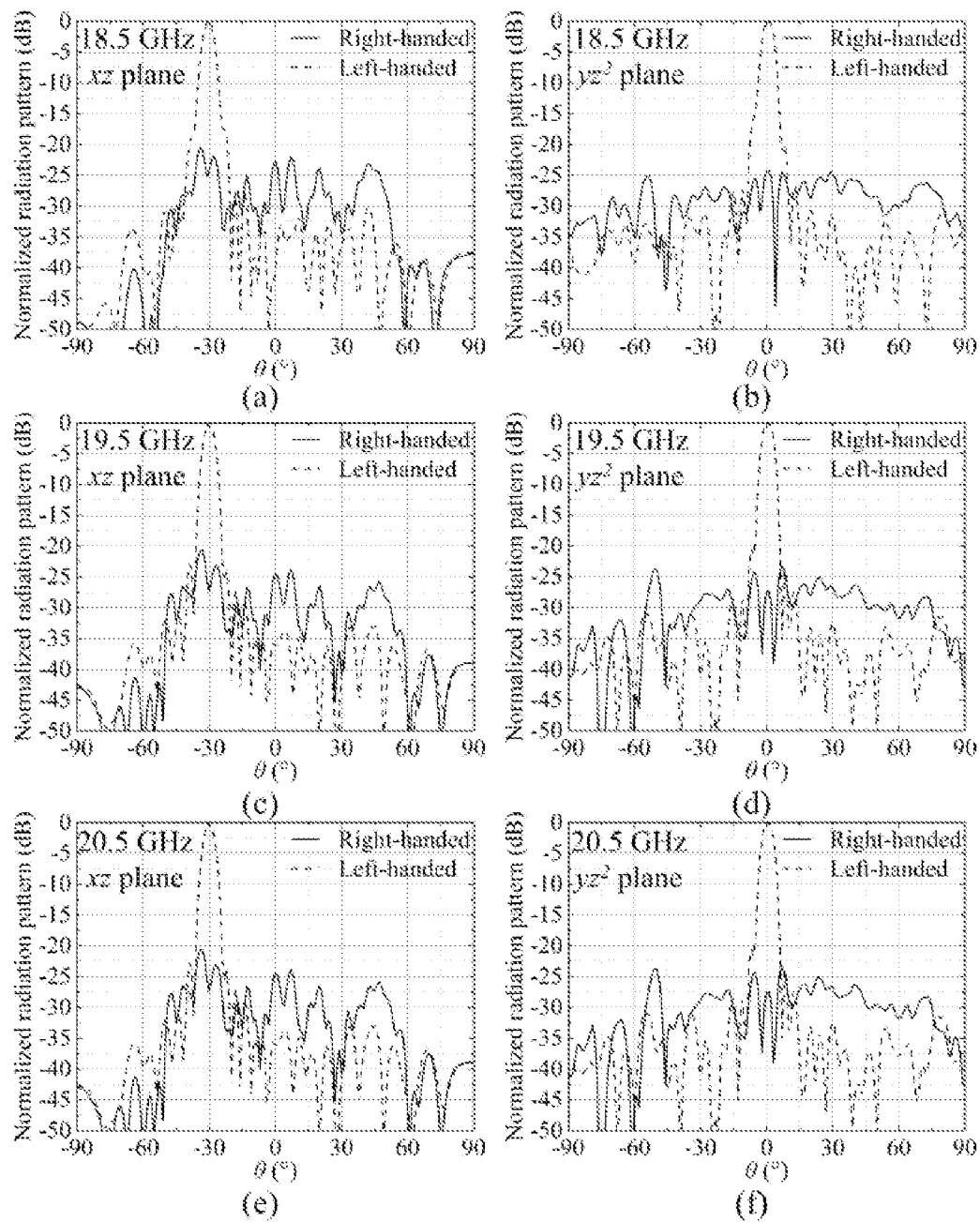
Figure 10:
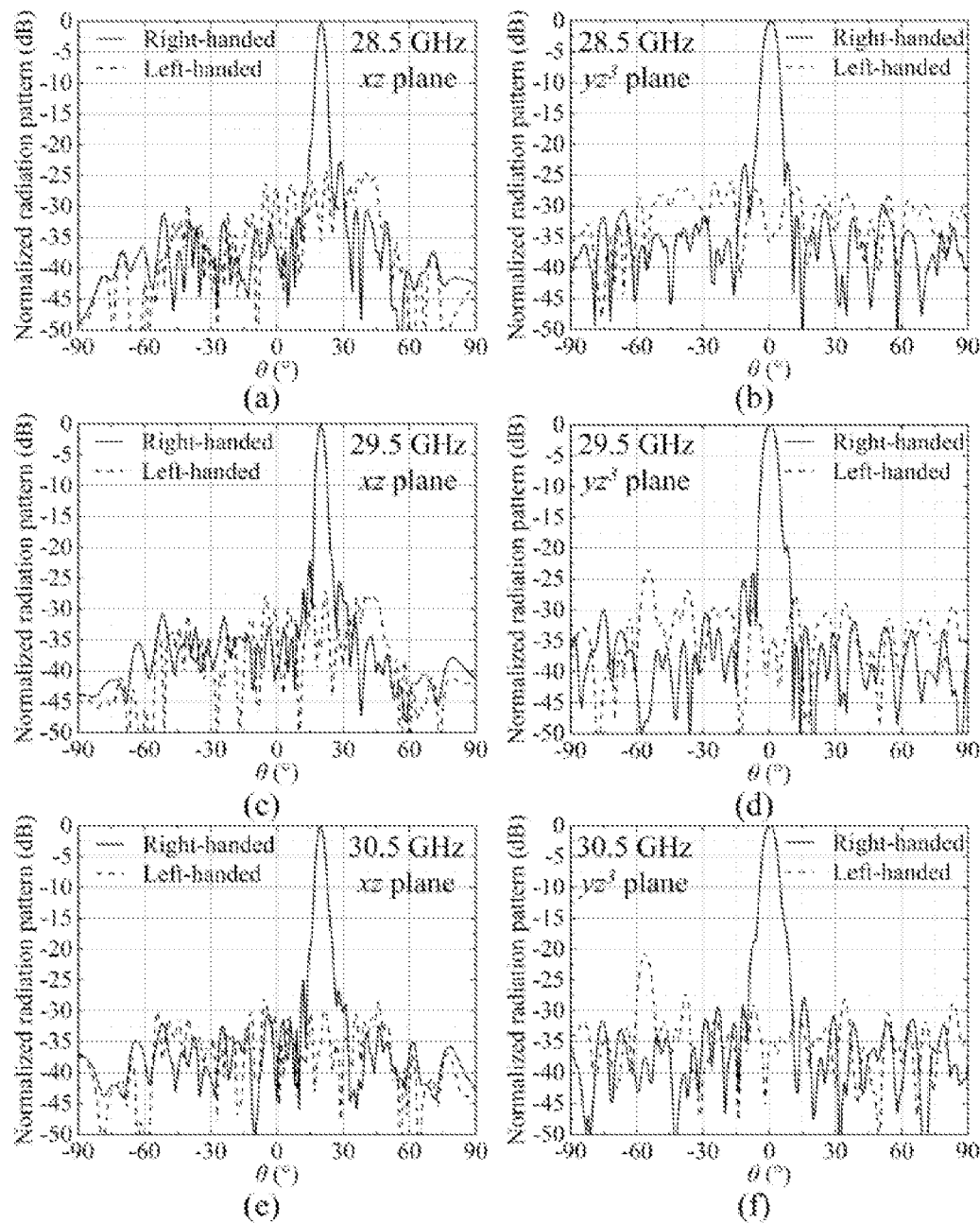
Figure 11:
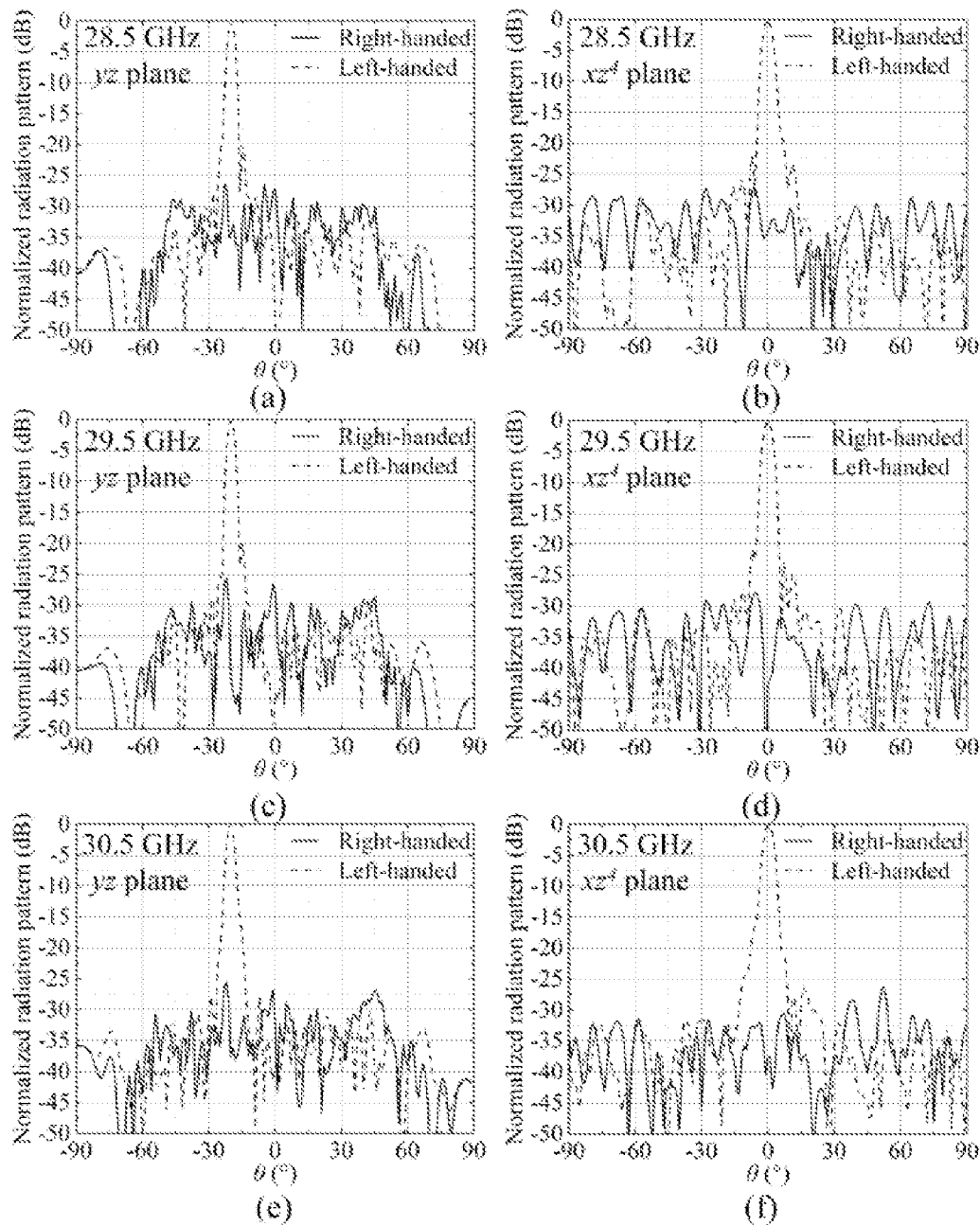
Figure 12:
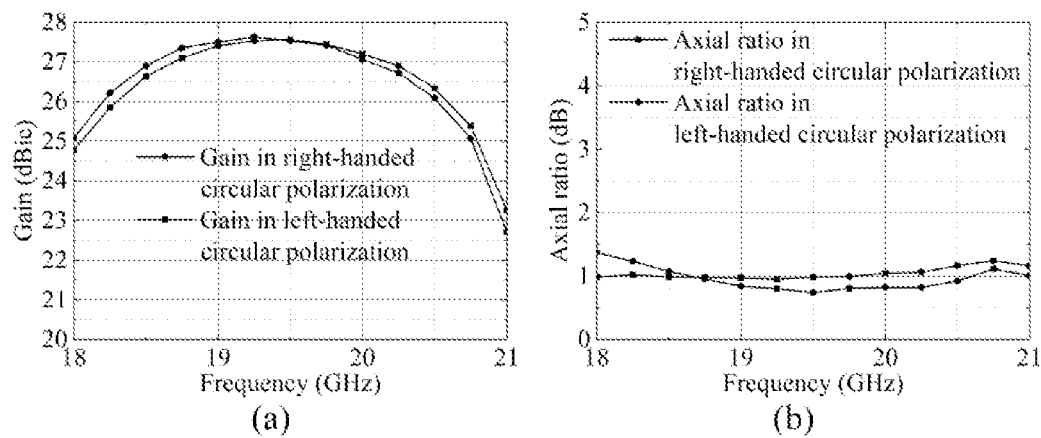
Figure 13:
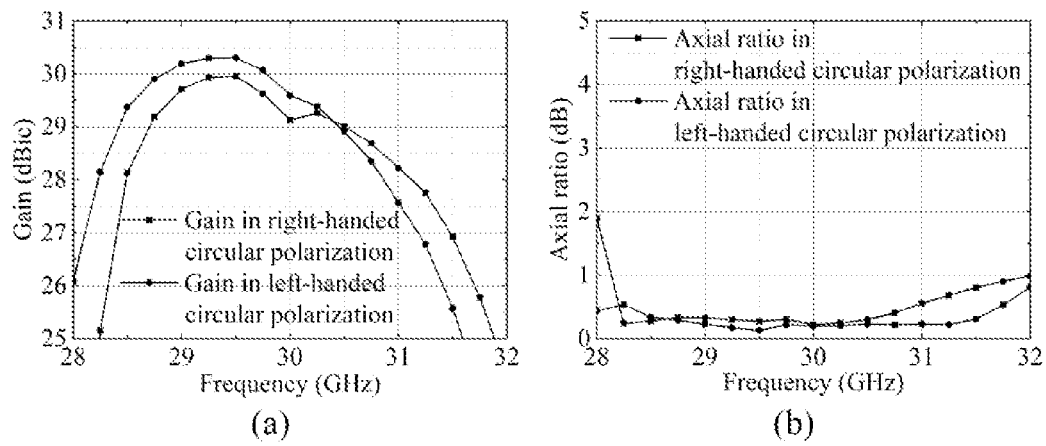

in the figure: 1. Planar broadband circularly polarized feed array, 2. K-band left-handed circularly polarized feed antenna, 3. K-band right-handed circularly polarized feed antenna, 4. Ka-band left-handed circularly polarized feed antenna, 5. Ka-band right-handed circularly polarized feed antenna, 6. Planar transmit-array, 7. K-band dual-circularly-polarized phase shifting cell, 8. Ka-band dual-circularly-polarized phase shifting cell;

1a. first feed substrate layer, 1b. second feed substrate layer, 1c. third feed substrate layer, 1d. Feed adhesive layer, 1e. Feed air layer;

2a. K-band left-handed circularly polarized feed microstrip circuit layer, 2b. K-band left-handed circularly polarized feed metal ground plane layer, 2c. K-band left-handed circularly polarized feed H-shaped gap, 2d. K-band left-handed circularly polarized first feed notched circular patch layer, 2e. K-band left-handed circularly polarized second feed notched circular patch layer;

3a. K-band right-handed circularly polarized feed microstrip circuit layer, 3b. K-band right-handed circularly polarized feed metal ground plane layer, 3c. K-band right-handed circularly polarized feed H-shaped gap, 3d. K-band right-handed circularly polarized first feed notched circular patch layer, 3e. K-band right-handed circularly polarized second feed notched circular patch layer 4a. Ka-band left-handed circularly polarized feed microstrip circuit layer, 4b. Ka-band left-handed circularly polarized feed metal ground plane layer, 4c. Ka-band left-handed circularly polarized feed H-shaped gap, 4d. Ka-band left-handed circularly polarized first feed notched circular patch layer, 4e. Ka-band left-handed circularly polarized second feed notched circular patch layer;

5a. Ka-band right-handed circularly polarized feed microstrip circuit layer, 5b. Ka-band right-handed circularly polarized feed metal ground plane layer, 5c. Ka-band right-handed circularly polarized feed H-shaped gap, 5d. Ka-band right-handed circularly polarized first feed notched circular patch layer, 5e. Ka-band right-handed circularly polarized second feed notched circular patch layer;

6a. transmit-array first substrate layer, 6b. transmit-array second substrate layer, 6c. transmit-array third substrate layer, 6d. transmit-array fourth substrate layer, 6e. transmit-array fifth substrate layer, 6f. transmit-array sixth substrate layer, 6g. transmit-array seventh substrate layer, 6h. transmit-array eighth substrate layer, 6i. transmit-array first adhesive layer, 6j. transmit-array second adhesive layer, 6k. transmit-array third adhesive layer, 6l. transmit-array fourth adhesive layer, 6m. transmit-array fifth adhesive layer, 6n. transmit-array sixth adhesive layer, and 6o. transmit-array seventh adhesive layer;

7a. K-band first metal layer, 7b. K-band second metal layer, 7c. K-band first metal via, 7d. K-band third metal layer, 7e. K-band fourth metal layer, 7f. K-band second metal via, 7g. K-band fifth metal layer, 7h. K-band third metal via, 7i. K-band sixth metal layer, 7j. K-band seventh metal layer, 7k. K-band fourth metal via, 7l. K-band eighth metal layer, 7m. K-band ninth metal layer, 7n. K-band fifth metal via, 7o. K-band tenth metal layer, 7p. K-band eleventh metal layer;

8a. Ka-band first metal layer, 8b. Ka-band first metal via, 8c. Ka-band second metal layer, 8d. Ka-band third metal layer, 8e. Ka-band second metal via, 8f. Ka-band fourth metal layer, 8g. Ka-band fifth metal layer, 8h. Ka-band third metal via, 8i. Ka-band fourth metal via, 8j. Ka-band sixth metal layer, 8k. Ka-band seventh metal layer, 8l. Ka-band eighth metal layer, 8m. Ka-band fifth metal via, 8n. Ka-band ninth metal layer;

FIG. 6 shows transmit coefficient magnitudes and transmit phases of first to fourth K-band and Ka-band dual-circularly-polarized cells, where FIG. 6a is corresponding to the K-band and FIG. 6b is corresponding to the Ka-band;

FIG. 7 shows a interstellar plots of the 2×2 bit dual-circularly-polarized transmission phase for the first to fourth K-band and Ka-band dual-circularly-polarized cells by rotating different angles, where FIG. 7a corresponding to a K-band transmission phase, and FIG. 7b corresponding to a Ka-band transmission phase;

FIG. 8 shows normalized radiation patterns of the dual-frequency and dual-circularly-polarized transmit-array antenna with independently controllable beams under the excitation of K-band right-handed circular polarization and left-handed circular polarization feed antenna, where a corresponds to a yz plane at 18.5 GHz, b corresponds to a $xz^1$ plane ($\hat{z}^1=\hat{z}\cos 30°+\hat{y}\sin 30°$) at 18.5 GHz, c corresponds to a yz plane at 19.5 GHz, d corresponds to the $xz^1$ plane at 19.5 GHz, e corresponds to the yz plane at 20.5 GHz, and f corresponds to the $xz^1$ plane at 20.5 GHz;

FIG. 9 shows normalized radiation patterns of the dual-frequency and dual-circularly-polarized transmit-array antenna under an excitation of K-band right-handed circular polarization and left-handed circular polarization feed antenna, where a corresponds to the xz plane at 18.5 GHz, b corresponds to a $yz^2$ plane ($\hat{z}^2=\hat{z}\cos 30°-\hat{x}\sin 30°$) at 18.5 GHz, c corresponds to the xz plane at 19.5 GHz, d corresponds to the $yz^2$ plane at 19.5 GHz, e corresponds to the xz plane at 20.5 GHz, and f corresponds to the $yz^2$ plane at 20.5 GHz;

FIG. 10 shows normalized radiation patterns of the dual-frequency and dual-circularly-polarized transmit-array antenna under the excitation of Ka-band right-handed circular polarization and left-handed circular polarization feed antenna, where a corresponds to a xz plane at 28.5 GHz, b corresponds to a $yz^3$ plane ($\hat{z}^3=\hat{z}\cos 20°+\hat{x}\sin 20°$) at 28.5 GHz, c corresponds to the xz plane at 29.5 GHz, d corresponds to the $yz^3$ plane at 29.5 GHz, e corresponds to the xz plane at 30.5 GHz, and f corresponds to the $yz^3$ plane at 30.5 GHz;

FIG. 11 shows normalized radiation patterns of the dual-frequency and dual-circularly-polarized transmit-array antenna under the excitation of Ka-band right-handed circular polarization and left-handed circular polarization feed antenna, where a corresponds to a yz plane at 28.5 GHz, b corresponds to a $xz^4$ plane ($\hat{z}^4=\hat{z}\cos 20°-\hat{y}\sin 20°$) at 28.5 GHz, c corresponds to the yz plane at 29.5 GHz, d corresponds to the $xz^4$ plane at 29.5 GHz, e corresponds to the yz plane at 30.5 GHz, and f is corresponds to the $xz^4$ plane at 30.5 GHz;

FIG. 12 shows curves of gain and axial ratio versus frequency of the dual-frequency and dual-circularly-polarized transmit-array antenna under the excitation of K-band left/right-handed circularly polarized feed antenna, where a corresponds to the gain, and b corresponds to the axial ratio; and FIG. 13 shows curves of gain and axial ratio versus frequency of the dual-frequency and dual-circularly-polarized transmit-array antenna under the excitation of Ka-band left/right-handed circularly polarized feed antenna, where a corresponds to the gain, and b is corresponds to the axial ratio.

DETAILED DESCRIPTION OF THE EMBODIMENTS

The present invention is further described below with reference to the accompanying drawings.

Embodiment 1

As shown in FIG. 1, this embodiment provides a dual-frequency and dual-circularly-polarized transmit-array antenna with independently controllable beams, which includes a planar broadband circularly polarized feed array 1 and a planar transmit-array 6. The planar broadband circularly polarized feed array 1 is placed near a focal plane of the planar transmit-array 6, and the planar transmit-array 6 has a diameter of D, which is set as 216 mm herein. A vertical distance from the planar broadband circularly polarized feed array 1 to the planar transmit-array 6 is F, which is set as 151.2 mm herein; and a value of F/D ranges from 0.3 to 1.5 and is set as 0.7 herein.

As shown in FIG. 1, the planar transmit-array 6 includes K-band dual-circularly-polarized phase shifting cells 7 and Ka-band dual-circularly-polarized phase shifting cells 8 that are periodically staggered in a shared-aperture manner. The K-band dual-circularly-polarized phase shifting cells 7 are two-dimensionally periodically arranged on the vertices of square grids with a side length of a K-band period length; and the Ka-band dual-circularly-polarized phase shifting cells 8 are two-dimensionally periodically arranged on the center points of square grids with a side length of the K-band period length. The period length of the K-band dual-circularly-polarized phase shifting cell 7 is 0.3 to 0.5 K-band free-space wavelength; and is set as 5.4 mm herein, i.e., 0.35 K-band wavelength. The period length of the Ka-band dual-circularly-polarized phase shifting unit 8 is 0.5 to 0.8 Ka-band wavelength; and is set as 5.4 mm herein, i.e., 0.53 Ka-band wavelength.

1. Planar Broadband Circularly Polarized Feed Array

Figure 2:
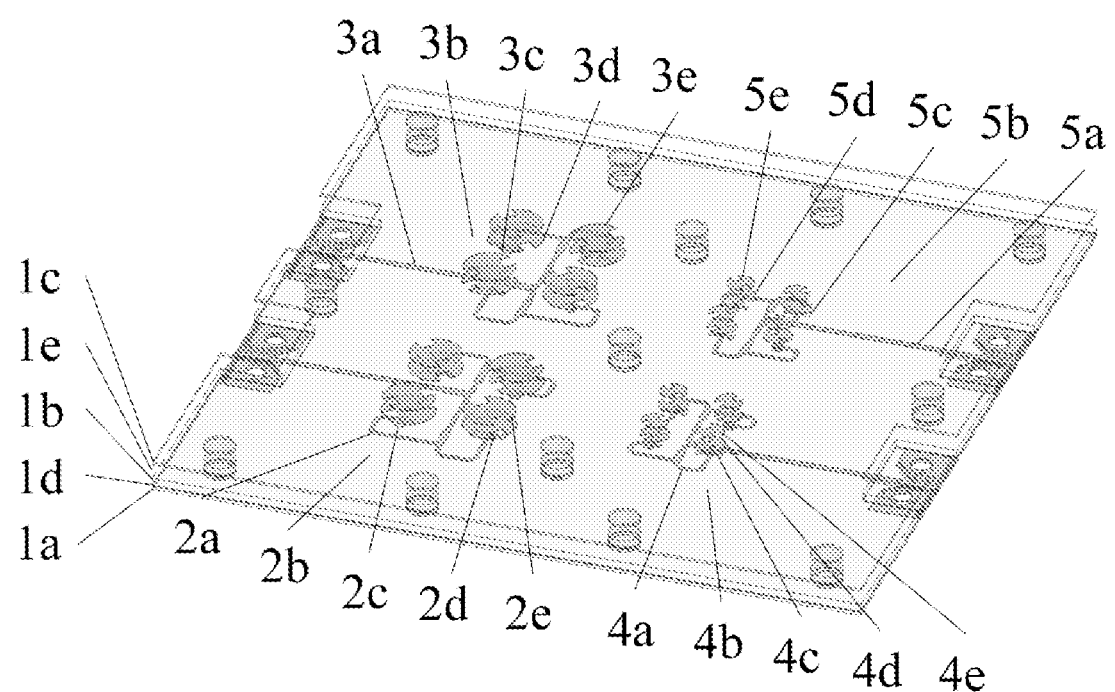
FIG. 2 is a schematic three-dimensional diagram of a planar broadband circularly polarized feed array.

As shown in FIG. 2, the planar broadband circularly polarized feed array 1 includes a K-band left-handed circularly polarized feed antenna 2, a K-band right-handed circularly polarized feed antenna 3, a Ka-band left-handed circularly polarized feed antenna 4, and a Ka-band right-handed circularly polarized feed antenna 5. These four feed antennas are each a broadband circularly polarized antenna constructed in a form of a microstrip line slot coupled stacked patch, and each have four metal layers; and they can be integrated in the same planar feed array. The four metal layers are respectively a feed microstrip circuit layer, a feed metal ground plane layer, a first feed notched circular patch layer, and a second feed notched circular patch layer from bottom to top, where the second feed notched circular patch layer faces the planar transmit-array.

As shown in FIG. 2, the planar broadband circularly polarized feed array 1 further includes three substrate layers, an adhesive layer and an air layer, where the three substrate layers are respectively a first feed substrate layer 1a, a second feed substrate layer 1b, and a third feed substrate layer 1c from bottom to top. A feed adhesive layer 1d is disposed between the first feed substrate layer 1a and the second feed substrate layer 1b, and a feed air layer 1e or a feed adhesive layer 1d is disposed between the second feed substrate layer 1b and the third feed substrate layer 1c.

In this embodiment, the feed microstrip circuit layer is disposed below the first feed substrate layer 1a, the feed metal ground plane layer is disposed above the first feed substrate layer 1a, the first feed notched circular patch layer is disposed above the second feed substrate layer 1b, and the first feed notched circular patch layer is disposed below the third feed substrate layer 1c.

As shown in FIG. 2, the four metal layers of the K-band left-handed circularly polarized feed antenna 2 are respectively a K-band left-handed circularly polarized feed microstrip circuit layer 2a, a K-band left-handed circularly polarized feed metal ground plane layer 2b, a K-band left-handed circularly polarized first feed notched circular patch layer 2d, and a K-band left-handed circularly polarized second feed notched circular patch layer 2e from bottom to top, where there are four K-band left-handed circularly polarized feed H-shaped gaps 2c on the K-band left-handed circularly polarized feed metal ground plane layer 2b.

The K-band right-handed circularly polarized feed antenna 3 consists of four metal layers, which are respectively a K-band right-handed circularly polarized feed microstrip circuit layer 3a, a K-band right-handed circularly polarized feed metal ground plane layer 3b, a K-band right-handed circularly polarized first feed notched circular patch layer 3d, and a K-band right-handed circularly polarized second feed notched circular patch layer 3e from bottom to top, where there are four K-band right-handed circularly polarized feed H-shaped gaps 3c on the K-band right-handed circularly polarized feed metal ground plane layer 3b.

The Ka-band left-handed circularly polarized feed antenna 4 consists of four metal layers, which are respectively a Ka-band left-handed circularly polarized feed microstrip circuit layer 4a, a Ka-band left-handed circularly polarized feed metal ground plane layer 4b, a Ka-band left-handed circularly polarized first feed notched circular patch layer 4d, and a Ka-band left-handed circularly polarized second feed notched circular patch layer 4e from bottom to top, where there are four Ka-band left-handed circularly polarized feed H-shaped gaps 4c on the Ka-band left-handed circularly polarized feed metal ground plane layer 4b.

The Ka-band right-handed circularly polarized feed antenna 5 consists of four metal layers, which are respectively a Ka-band right-handed circularly polarized feed microstrip circuit layer 5a, a Ka-band right-handed circularly polarized feed metal ground plane layer 5b, a Ka-band right-handed circularly polarized first feed notched circular patch layer 5d, and a Ka-band right-handed circularly polarized second feed notched circular patch layer 5e from bottom to top, where there are four Ka-band right-handed circularly polarized feed H-shaped gaps 5c on the Ka-band right-handed circularly polarized feed metal ground plane layer 5b.

In this embodiment, the overall profile of the transmit-array antenna is reduced and the multi-frequency and multi-polarization functionalities are met by employing the planar broadband circularly polarized feed array.

In this embodiment, the K-band left-handed circularly polarized feed antenna 2, the K-band right-handed circularly polarized feed antenna 3, the Ka-band left-handed circularly polarized feed antenna 4, and the Ka-band right-handed circularly polarized feed antenna 5 are each a broadband circularly polarized antenna constructed in a form of a microstrip line slot coupled stacked patch.

Taking the K-band left-handed circularly polarized feed antenna 2 as an example, the feed microstrip circuit layer 2a includes a K-band left-handed circularly polarized feed microstrip circuit, where the microstrip circuit consists of three power dividers and includes one input port and four output ports, and a −90-degree phase difference required for left-handed circular polarization is formed between the four output ports. The first notched circular patch layer 2d of the K-band left-handed circularly polarized feed antenna 2 has four notched circular patches rotating 90 degrees in sequence, and the second notched circular patch layer 2e also has four notched circular patches rotating 90 degrees in sequence. There are four H-shaped slots 2c rotating 90 degrees in sequence on the metal ground plane layer 2b of the K-band left-handed circularly polarized feed antenna 2. Therefore, an electromagnetic wave fed in from the microstrip circuit is divided into four parts, which are coupled to the four stacked notched circular patches through the four H-shaped slots on the metal ground plane. Because of a phase difference of −90 degrees between the four output ports of the microstrip circuit, a broadband left-handed circularly polarized wave is formed. Likewise, when the four output ports of the microstrip circuit are designed to have a phase difference of 90 degrees, a K-band right-handed circularly polarized wave can be formed.

By scaling the K-band left/right-handed circularly polarized antenna is scaled down to a Ka-band, a Ka-band left/right-handed circularly polarized antenna can be obtained.

2. Planar Transmit-Array

In the present invention, the K-band dual-circularly-polarized phase shifting cell 7 and the Ka-band dual-circularly-polarized phase shifting cell 8 each take a form of receiving antenna-phase shifting stripline-transmitting antenna. That is, the K-band dual-circularly-polarized phase shifting cell 7 and the Ka-band dual-circularly-polarized phase shifting cell 8 each include a receiving antenna, a phase shifting stripline, and a transmitting antenna, where the receiving antenna and the transmitting antenna are connected via a phase shifting stripline. Such a form can be realized by several metal layers disposed from bottom to top. That is, the metal layers form the receiving antenna, the phase shifting stripline, and the transmitting antenna of each K-band dual-circularly-polarized phase shifting cell 7 or each Ka-band dual-circularly-polarized phase shifting cell 8. By setting a phase shifting degree of the metal layer for the phase shifting stripline of the K-band dual-circularly-polarized phase shifting cell 7, linearly polarized transmit phases corresponding to four K-band dual-circularly-polarized phase shifting cells 7 in the planar transmit-array 6 are set to have a 45-degree difference between adjacent cells.

The planar transmit-array 6 further includes several substrate layers and adhesive layers, where each metal layer of each phase unit is disposed above or below a substrate layer in a stacked patch form, and the adhesive layer is disposed between adjacent substrate layers.

In the present invention, the numbers of the metal layers in the K-band dual-circularly-polarized phase shifting cell 7 and in the Ka-band dual-circularly-polarized phase shifting cell 8 are not unique, and can be adjusted according to the antenna performance requirements such as the bandwidth and profile.

Figure 4:
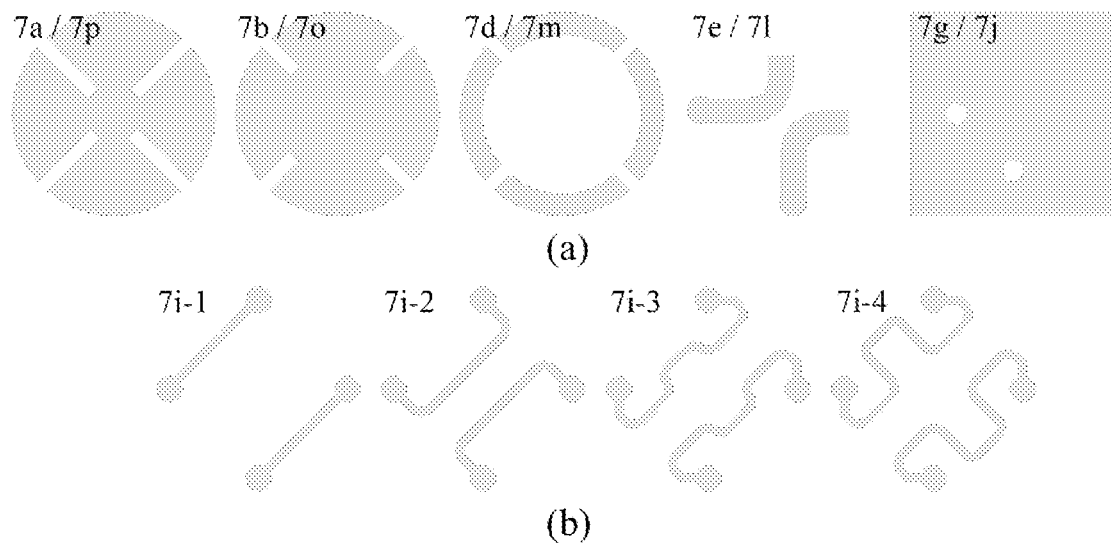
FIG. 4 is a top view of metal layers of the K-band dual-circularly-polarized phase shifting cell.
Figure 5:
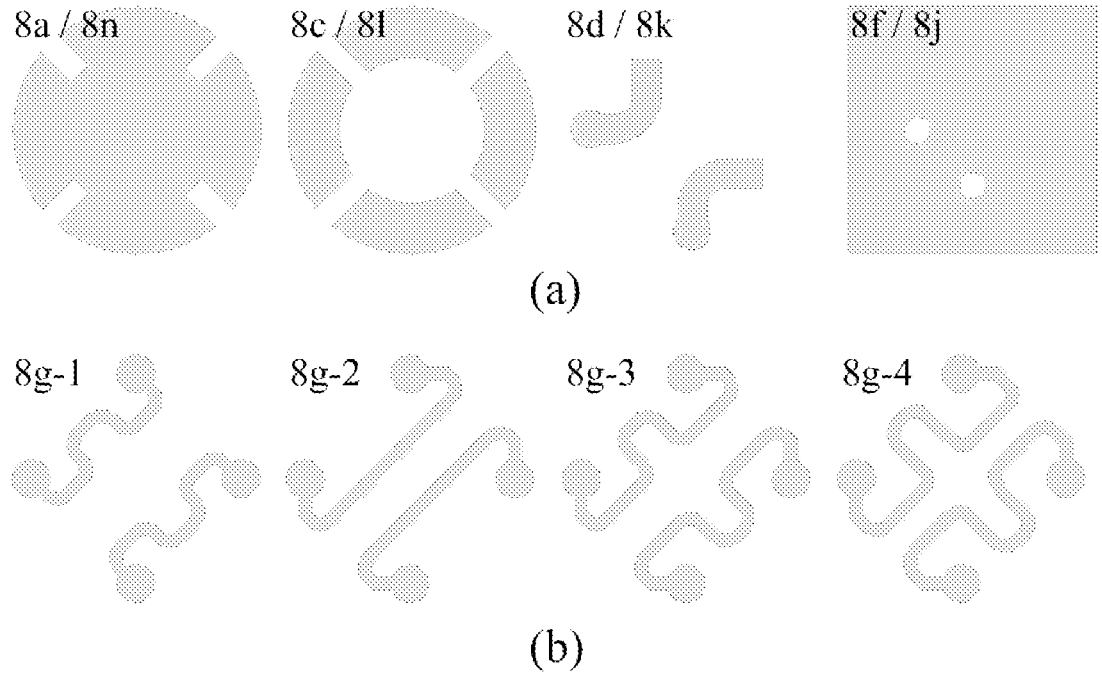
FIG. 5 is a top view of metal layers of the Ka-band dual-circularly-polarized phase shifting cell.

In this embodiment, taking a phase shifting cell with a symmetric structure as an example, in a case where the transmitting antenna and the receiving antenna have the same form, the K-band dual-circularly-polarized phase shifting cell 7 includes eleven metal layers and the Ka-band dual-circularly-polarized phase shifting cell 8 include nine metal layers. Specific structures are shown in FIGS. 3 to 5, and the planar transmit-array 6 consists of eight substrate layers and seven adhesive layers;

where the eight substrate layers are respectively a transmit-array first substrate layer 6a, a transmit-array second substrate layer 6b, a transmit-array third substrate layer 6c, a transmit-array fourth substrate layer 6d, a transmit-array fifth substrate layer 6e, a transmit-array sixth substrate layer 6f, a transmit-array seventh substrate layer 6g, and a transmit-array eighth substrate layer 6h from bottom to top, and the seven adhesive layers of the planar transmit-array are respectively a transmit-array first adhesive layer 6i, a transmit-array second adhesive layer 6j, a transmit-array third adhesive layer 6k, a transmit-array fourth adhesive layer 6l, a transmit-array fifth adhesive layer 6m, a transmit-array sixth adhesive layer 6n, and a transmit-array seventh adhesive layer 6o from bottom to top.

Figure 3:
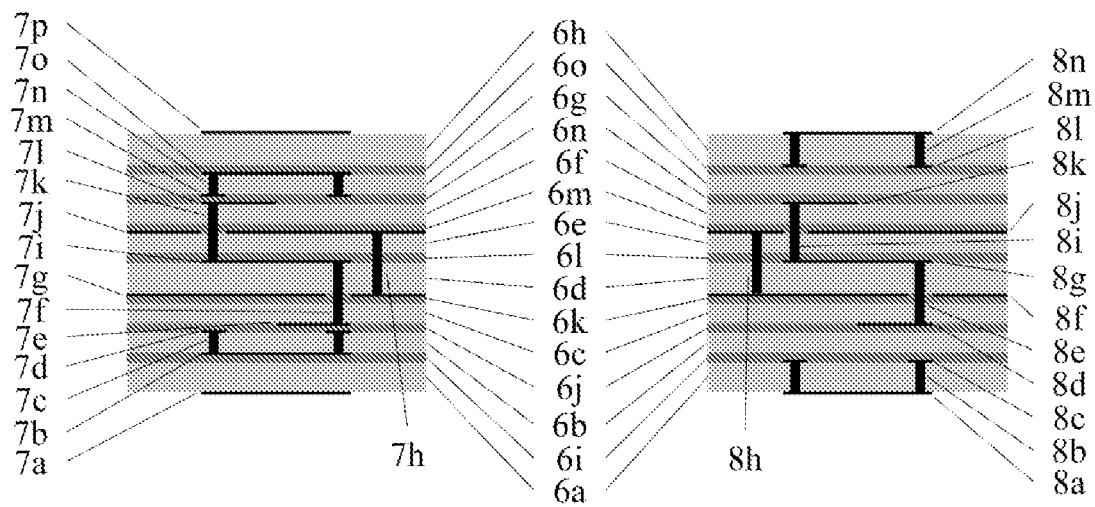
FIG. 3 is a schematic diagram of a stacked structure of a K-band dual-circularly-polarized phase shifting cell and a Ka-band dual-circularly-polarized phase shifting cell.

As shown in FIG. 3, the K-band dual-circularly-polarized phase shifting cell 7 consists of eleven metal layers, and the Ka-band dual-circularly-polarized phase shifting cell 8 consists of nine metal layers;

where the eleven metal layers of the K-band dual-circularly-polarized phase shifting cell 7 are respectively a K-band first metal layer 7a, a K-band second metal layer 7b, a K-band third metal layer 7d, a K-band fourth metal layer 7e, a K-band fifth metal layer 7g, a K-band sixth metal layer 7i, a K-band seventh metal layer 7j, a K-band eighth metal layer 7l, a K-band ninth metal layer 7m, a K-band tenth metal layer 7o, and a K-band eleventh metal layer 7p from bottom to top, where the K-band second metal layer 7b and the K-band third metal layer 7d are connected by sixteen K-band first metal vias 7c, the K-band fourth metal layer 7e and the K-band sixth metal layer 7i are connected by two K-band second metal vias 7f, the K-band fifth metal layer 7g and the K-band seventh metal layer 7j are connected by thirty-six K-band third metal vias 7h, the K-band sixth metal layer 7i and the K-band eighth metal layer 7l are connected by two K-band fourth metal vias 7k, and the K-band ninth metal layer 7m and the K-band tenth metal layer 7o are connected by sixteen K-band fifth metal vias 7n, where these metal vias are used for isolation and their numbers are not unique. The K-band second metal layer 7b, the K-band third metal layer 7d, the K-band ninth metal layer 7m, the K-band fifth metal via 7n, the K-band first metal via 7c, and the K-band tenth metal layer 7o are optional.

The nine metal layers of the Ka-band dual-circularly-polarized phase shifting cell 8 are respectively a Ka-band first metal layer 8a, a Ka-band second metal layer 8c, a Ka-band third metal layer 8d, a Ka-band fourth metal layer 8f, a Ka-band fifth metal layer 8g, a Ka-band sixth metal layer 8j, a Ka-band seventh metal layer 8k, a Ka-band eighth metal layer 8l, a Ka-band ninth metal layer 8n from bottom to top, where the Ka-band first metal layer 8a and the Ka-band second metal layer 8c are connected by eight Ka-band first metal vias 8b, the Ka-band third metal layer 8d and the Ka-band fifth metal layer 8g are connected by two Ka-band second metal vias 8e, the Ka-band fourth metal layer 8f and the Ka-band sixth metal layer 8j are connected by thirty Ka-band third metal vias 8h, the Ka-band fifth metal layer 8g and the Ka-band seventh metal layer 8k are connected by two Ka-band fourth metal vias 8i, and the Ka-band eighth metal layer 8l and the Ka-band ninth metal layer 8n are connected by eight Ka-band fifth metal vias 8m, where these metal vias are used for isolation and their numbers are not unique. The Ka-band eighth metal layer 8l, the Ka-band fifth metal via 8m, the Ka-band first metal via 8b, and the Ka-band second metal layer 8c are optional.

As shown in FIG. 3, the K-band first metal layer 7a of the K-band dual-circularly-polarized phase shifting cell 7 is under the transmit-array first substrate layer 6a, the K-band second metal layer 7b is under the transmit-array second substrate layer 6b, the K-band third metal layer 7d is under the transmit-array second substrate layer 6b, the K-band fourth metal layer 7e is under the transmit-array third substrate layer 6c, the K-band fifth metal layer 7g is under the transmit-array fourth substrate layer 6d, the K-band sixth metal layer 7i is above the transmit-array fourth substrate layer 6d, the K-band seventh metal layer 7j is above the transmit-array fifth substrate layer 6e, the K-band eighth metal layer 7l is above the transmit-array sixth substrate layer 6f, the K-band ninth metal layer 7m is under the transmit-array seventh substrate layer 6g, the K-band tenth metal layer 7o is above the transmit-array seventh substrate layer 6g, and the K-band eleventh metal layer 7p is above the transmit-array eighth substrate layer 6h;

the Ka-band first metal layer 8a of the Ka-band dual-circularly-polarized phase shifting cell 8 is under the transmit-array first substrate layer 6a, the Ka-band second metal layer 8c is above the transmit-array first substrate layer 6a, the Ka-band third metal layer 8d is below the transmit-array third substrate layer 6c, the Ka-band fourth metal layer 8f is below the transmit-array fourth substrate layer 6d, the Ka-band fifth metal layer 8g is above the transmit-array fourth substrate layer 6d, the Ka-band sixth metal layer 8j is above the transmit-array fifth substrate layer 6e, the Ka-band seventh metal layer 8k is above the transmit-array sixth substrate layer 6f, the Ka-band eighth metal layer 8l is under the transmit-array eighth substrate layer 6h, and the Ka-band ninth metal layer 8n is above the transmit-array eighth substrate layer 6h.

As shown in FIG. 4, the K-band first metal layer 7a and the K-band eleventh metal layer 7p are each a circular patch with notches at ±45 degrees, the K-band second metal layer 7b and the K-band tenth metal layer 7o are each a circular patch with notches at ±45 degrees, the K-band third metal layer 7d and the K-band ninth metal layer 7m are each a circular patch with notches ±45 degrees, the K-band fourth metal layer 7e and the K-band eighth metal layer 7l are each orthogonal L-shaped microstrip lines, the K-band fifth metal layer 7g and the K-band seventh metal layer 7j are each a metal ground plane provided with two circular holes, and the K-band sixth metal layer 7i is formed by two phase shifting striplines, where the K-band sixth metal layer 7i is classified into 7i-1, 7i-2, 7i-3, and 7i-4 according to different phase shifting values, namely, different lengths of the striplines of the K-band sixth metal layer 7i.

As shown in FIG. 5, the Ka-band first metal layer 8a and the Ka-band ninth metal layer 8n are each a circular patch with notches at ±45 degrees, the Ka-band second metal layer 8c and the Ka-band eighth metal layer 8l are each a circular patch with notches ±45 degrees, the Ka-band third metal layer 8d and the Ka-band seventh metal layer 8k are each orthogonal L-shaped microstrip lines, the Ka-band fourth metal layer 8f and the Ka-band sixth metal layer 8j are each a metal ground plane provided with two circular holes, and the Ka-band fifth metal layer 8g is formed by two phase shifting striplines, where the Ka-band fifth metal layer 8g is classified into 8g-1, 8g-2, 8g-3, and 8g-4 according to different phase shifting values.

It can be seen from the above-described structure that, in this embodiment, the K-band dual-circularly-polarized phase shifting cell 7 takes an antenna form of L-shaped microstrip stub-fed stacked patches; and by employing two adjacent but non-coincident resonances generated by the stacked patches, the impedance bandwidth of the antenna is broadened. In order to reduce the antenna size, the patch is notched in this embodiment. For example, as shown by the structures of 7a and 7p, a rectangular slot is etched in the patches at ±45-degree directions to meander the current path for the purpose of reducing the patch size. Further, the lower-layer circular patches are bent to further reduce the patch size, for example, the bent patches formed in 7b, 7c, and 7d, and the bent patches formed in 7o, 7n, and 7m, thus realizing bending of 7b and 7o in the K-band. The designed K-band antennas are back to back placed and connected by striplines, to obtain the K-band dual-circularly-polarized phase shifting cell. Herein, the stripline is utilized to connect the transmitting antenna and the receiving antenna, and by changing the length of the stripline, the function of changing the transmit phase can be obtained.

In order to achieve the function of simultaneously and independently adjusting the transmit phases in right-handed circular polarization and left-handed circular polarization, four cells with different phase shifting degrees are designed, where the four designed cells have a 45-degree difference between each other and thus have a dynamic phase modulation function. Based on this, the four designed cells are rotated and a rotational phase change is introduced. Therefore, a total of 16 states is achieved which can provide 2×2 bit dual-circularly-polarized phase compensation for independently modulating the transmission phases in right-handed circular polarization and left-handed circular polarization.

Specifically, according to the different lengths of the two phase shifting striplines of the K-band sixth metal layer, the K-band dual-circularly-polarized phase shifting cell is named as a first K-band dual-circularly-polarized phase shifting cell, a second K-band dual-circularly-polarized phase shifting cell, a third K-band dual-circularly-polarized phase shifting cell, and a fourth K-band dual-circularly-polarized phase shifting cell. The transmit phase ($\phi(t_{yx})$) from x polarization to y polarization of the K-band dual-circularly-polarized phase shifting cell is consistent with the transmit phase ($\phi(t_{yx})$) from y polarization to x polarization. The transmit phases differ by −45 degrees between the four K-band dual-circularly-polarized phase shifting cells successively. That is, the second K-band dual-circularly-polarized phase shifting cell lags behind the first K-band dual-circularly-polarized phase shifting cell by −45 degrees, the third K-band dual-circularly-polarized phase shifting cell lags behind the second K-band dual-circularly-polarized phase shifting cell by −45 degrees, and the fourth K-band dual-circularly-polarized phase shifting cell lags behind the third K-band dual-circularly-polarized phase shifting cell by −45 degrees. After the first and third K-band dual-circularly-polarized phase shifting cells are rotated by 0, 45, 90, and 135 degrees about their centers, and the second and fourth K-band dual-circularly-polarized phase shifting cells are rotated by 22.5, 67.5, 112.5, and 157.5 degrees about their centers, which means a total of 16 states is achieved which can provide 2×2 bit dual-circularly-polarized phase modulation in the K band.

Similarly, the Ka-band dual-circularly-polarized phase shifting cell 8 takes a form of L-shaped microstrip stub-fed single-layer circular patches. In order to reduce the size of the antenna, a rectangular slot is etched in the patches at ±45-degree directions, and the circular patches are bent. In a specific implementation process, according to the requirements for the system bandwidth and profile, the number of the patches can be appropriately increased or decreased without affecting the functions of the dual-frequency and dual-circularly-polarized transmit-array antenna. The designed Ka-band antennas are placed back to back and connected by striplines, for obtaining the Ka-band dual-circularly-polarized phase shifting cell. Herein, the stripline functions to connect the transmitting antenna and the receiving antenna, and by changing the length of the stripline, the function of changing the transmit phase can be obtained. In order to achieve the function of simultaneously and independently adjusting the transmit phases in right-handed circular polarization and left-handed circular polarization, four designed cells provide dynamic phase modulation and have a 45-degree phase difference between each other. Based on this, the four designed cells are rotated and a rotational phase change is introduced for obtaining a total of 16 states is achieved which can provide 2×2 bit dual-circularly-polarized for independently modulating the transmission phases in right-handed circular polarization and left-handed circular polarization. Therefore, the Ka-band left/right-handed circularly polarized wave radiated from the feed antenna is first received by a receiving antenna of the Ka-band dual-circularly-polarized phase shifting cell, and then passes through the phase shifting striplines and reaches the transmitting antenna for radiation. The phase of the electromagnetic wave has been modulated after it passes through the phase shifting striplines, and therefore, the radiation beam can point in a predetermined direction.

Specifically, according to the different lengths of the two phase shifting striplines of the Ka-band fifth metal layer, the Ka-band dual-circularly-polarized phase shifting cell is named as a first Ka-band dual-circularly-polarized phase shifting cell, a second Ka-band dual-circularly-polarized phase shifting cell, a third Ka-band dual-circularly-polarized phase shifting cell, and a fourth Ka-band dual-circularly-polarized phase shifting cell. The transmit phase ($\phi(t_{yx})$) from x polarization to y polarization of the Ka-band dual-circularly-polarized phase shifting cell is consistent with the transmit phase ($\phi(t_{yx})$) from y polarization to x polarization. The transmit phases differ by −45 degrees between the four Ka-band dual-circularly-polarized phase shifting cells successively. That is, the second Ka-band dual-circularly-polarized phase shifting cell lags behind the first Ka-band dual-circularly-polarized phase shifting cell by −45 degrees, the third Ka-band dual-circularly-polarized phase shifting cell lags behind the second Ka-band dual-circularly-polarized phase shifting cell by −45 degrees, and the fourth Ka-band dual-circularly-polarized phase shifting cell lags behind the third Ka-band dual-circularly-polarized phase shifting cell by −45 degrees. After the first and third Ka-band dual-circularly-polarized phase shifting cells are rotated by 0, 45, 90, and 135 degrees about their centers, and the second and fourth Ka-band dual-circularly-polarized phase shifting cells are rotated by 22.5, 67.5, 112.5, and 157.5 degrees about their centers, a total of 16 states is achieved which can provide 2×2 bit dual-circularly-polarized for independently modulating the transmission phases in right-handed circular polarization and left-handed circular polarization.

Different from the conventional half-wave-plate unit structures with a 180-degree phase difference between optical axes x and y optical axes, the present invention uses a novel architecture, i.e., the received x(y)-linearly polarized waves are transformed to y(x)-linearly polarized transmitted waves, which can eliminate the dispersion caused by phase shifting lines with different lengths in the conventional half-wave-plate structure, thus realizing wider gain and axial-ratio bandwidth. In the present invention, the precision of the circular polarization is set as 2 bits, which corresponds to the linear polarization precision of 3 bits. That is, the adjacent cells differ in phase is 45 degree. If the circular polarization precision is set as n (n≥1) bits, the corresponding linear polarization modulation precision is (n+1) bits. Therefore, the Ka-band left/right-handed circularly polarized wave radiated from the feed antenna is first received by the receiving antenna of the Ka-band dual-circularly polarized phase shifting cell, and then passes through the phase shifting striplines and reaches to the transmitting antenna. The phase of the incident electromagnetic wave has been modulated after it passes through the phase shifting striplines, and therefore, the beam can point in a predetermined direction.

FIG. 6a shows transmit coefficient magnitudes and transmit phases of the first to fourth K-band dual-circularly-polarized phase shifting cells. It can be seen from the figure that, in a working frequency band, the cross-polarized transmit coefficient magnitudes are all higher than −2 dB, the co-polarized transmit coefficient magnitudes are all lower than −10 dB, the first to fourth K-band dual-circularly-polarized phase shifting cells differ in transmit phase by 45 degrees from each other, and phase shifting curves remain parallel within a certain bandwidth, thus ensuring the working bandwidths of the dual-circularly-polarized phase shifting cells.

FIG. 6b shows transmit coefficient magnitudes and transmit phases of the first to fourth Ka-band dual-circularly-polarized phase shifting cells. It can be seen from the figure that, in a working frequency band, the cross-polarized transmit coefficient magnitudes are all higher than −2 dB, the co-polarized transmit coefficient magnitudes are all lower than −16 dB, the first to fourth Ka-band dual-circularly-polarized phase shiftinging cells differ in transmit phase by 45 degrees from each other, and phase shifting curves remain parallel within a certain bandwidth, thus ensuring the working bandwidths of the dual-circularly-polarized phase shiftinging cells.

FIG. 7a shows a interstellar plots of the 2×2 bit dual-circularly-polarized transmission phase of the 16 states in the K band that are formed by rotating the first and third K-band dual-circularly-polarized phase shifting cells are rotated about their centers by 0, 45, 90, and 135 degrees and the second and fourth K-band dual-circularly-polarized phase shifting cells are rotated about their centers by 22.5, 67.5, 112.5, and 157.5 degrees.

FIG. 7b shows a interstellar plots of the 2×2 bit dual-circularly-polarized transmission phase of the 16 states in the Ka band that are formed by rotating the first and third Ka-band dual-circularly-polarized phase shifting cells are rotated about their centers by 0, 45, 90, and 135 degrees and the second and fourth Ka-band dual-circularly-polarized phase shifting cells are rotated about their centers by 22.5, 67.5, 112.5, and 157.5 degrees.

According to the left-handed and right-handed circularly polarized transmit phase distributions required by the K/Ka-band periodically staggered cells in the planar transmit-array, one of a total of designed 16 states by 2 bits of right-handed circular polarization x 2 bits of left-handed circular polarization is placed on a position of a corresponding unit in the planar transmit-array, thus making the K/Ka-band dual-circularly-polarized beams independently controllable. Finally, the K-band right-handed circularly polarized wave points at $\theta$=30 degrees and $\varphi$=90 degrees ($\theta$ refers to the elevation angle and p refers to the azimuth angle), with a maximum gain of 27.5 dBic and an efficiency of 29.3%. The K-band left-handed circularly polarized wave points at $\theta$=−30 degrees and $\varphi$=0 degrees, with a maximum gain of 27.6 dBic and an efficiency of 29.8%. The 2 dB gain bandwidths in the K-band right- and left-handed circular polarization are both 13%, and the axial ratios within this bandwidth are both less than 1.5 dB. The Ka-band right-handed circularly polarized wave points at $\theta$=20 degrees and $\varphi$=0 degrees, with a maximum gain of 30 dBic and an efficiency of 23.4%. The Ka-band left-handed circularly polarized wave points at $\theta$=−20 degrees and $\varphi$=90 degrees, with a maximum gain of 30.3 dBic and an efficiency of 25.3%. The 2 dB gain bandwidth in the Ka-band right-handed circular polarization is 9.1%, and the 2 dB gain bandwidth in the Ka-band left-handed circular polarization is 8.5%; and the axial ratios within this bandwidth are both less than 1 dB.

FIG. 8 shows normalized radiation patterns of the dual-frequency and dual-circularly-polarized transmit-array antenna with independently controllable beams in the cases of right-handed circular polarization and left-handed circular polarization, calculated within yz and $xz^1$ planes at 18.5, 19.5, and 20.5 GHz under the excitation by a K-band left-handed circularly polarized feed antenna. It can be seen from the figure that there is a right-handed circularly polarized beam pointing at 30 degrees in the yz plane.

A plane where the planar transmit-array 6 is located is used as the xy plane, and the z axis is perpendicular to the xy plane.

FIG. 9 shows normalized radiation patterns of the dual-frequency and dual-circularly-polarized transmit-array antenna with independently controllable beams in the cases of right-handed circular polarization and left-handed circular polarization, calculated within xz and $yz^2$ planes at 18.5, 19.5, and 20.5 GHz under the excitation by a K-band right-handed circularly polarized feed antenna. It can be seen from the figure that there is a left-handed circularly polarized beam pointing at −30 degrees in the xz plane.

FIG. 10 shows normalized radiation patterns of the dual-frequency and dual-circularly-polarized transmit-array antenna with independently controllable beams in the cases of right-handed circular polarization and left-handed circular polarization, calculated within xz and $yz^3$ planes at 28.5, 29.5, and 30.5 GHz under the excitation by a Ka-band left-handed circularly polarized feed antenna. It can be seen from the figure that there is a right-handed circularly polarized beam pointing at 20 degrees in the xz plane.

FIG. 11 shows normalized radiation patterns of the dual-frequency and dual-circularly-polarized transmit-array antenna with independently controllable beams in the cases of right-handed circular polarization and left-handed circular polarization, calculated within yz and $xz^4$ planes at 28.5, 29.5, and 30.5 GHz under the excitation by a Ka-band right-handed circularly polarized feed antenna. It can be seen from the figure that there is a left-handed circularly polarized beam pointing at −20 degrees in the yz plane.

FIG. 12 shows curves of gain and axial ratio versus frequency of the dual-frequency and dual-circularly-polarized transmit-array antenna with independently controllable beams, calculated under the excitation by a K-band left/right-handed circularly polarized feed antenna. It can be seen from the figure that, the 2 dB gain bandwidths of the generated K-band left/right-handed circularly polarized beams are both 13%, and the axial ratios within this bandwidth are all lower than 1.5 dB.

FIG. 13 shows curves of gain and axial ratio versus frequency of the dual-frequency and dual-circularly-polarized transmit-array antenna with independently controllable beams, calculated under the excitation by a Ka-band left/right-handed circularly polarized feed antenna. It can be seen from the figure that, the 2 dB gain bandwidth of the generated Ka-band right-handed circularly polarized beam is 9.1%, the 2 dB gain bandwidth of the Ka-band left-handed circularly polarized beam is 8.5%, and the axial ratios within this bandwidth are all lower than 1 dB.

To sum up, the present invention provides a dual-frequency and dual-circularly-polarized transmit-array antenna with independently controllable beams, which can work in both K-band and Ka-band. Such a transmit-array antenna has the advantages of low profile and easy integration, and can provide functionalities of dual frequency and dual circular polarization, broad band, high gain, low axial ratio, low gain jitter, and independently-controllable circularly polarized beams, thus having significant application prospects in further mobile communications and satellite communications.

The above merely describes preferred embodiments of the present invention. It should be noted that, several improvements and modifications may be made by those of ordinary skill in the art without departing from the principle of the present invention, and these improvements and modifications should also be construed as falling within the protection scope of the present invention.

What is claimed is:

1. A dual-frequency and dual-circularly-polarized transmit-array antenna with independently controllable beams, comprising: a planar broadband circularly polarized feed array and a planar transmit-array that are disposed in parallel to each other, wherein the planar broadband circularly polarized feed array comprises a K-band left-handed circularly polarized feed antenna, a K-band right-handed circularly polarized feed antenna, a Ka-band left-handed circularly polarized feed antenna, and a Ka-band right-handed circularly polarized feed antenna that are disposed in the same plane.

2. The dual-frequency and dual-circularly-polarized transmit-array antenna with independently controllable beams according to claim 1, wherein the K-band left-handed circularly polarized feed antenna, the K-band right-handed circularly polarized feed antenna, the Ka-band left-handed circularly polarized feed antenna, and the Ka-band right-handed circularly polarized feed antenna are each a broadband circularly polarized antenna constructed in a form of a microstrip line slot coupled stacked patch, and are integrated in the same planar feed array.

3. The dual-frequency and dual-circularly-polarized transmit-array antenna with independently controllable beams according to claim 1, wherein the K-band left-handed circularly polarized feed antenna, the K-band right-handed circularly polarized feed antenna, the Ka-band left-handed circularly polarized feed antenna, and the Ka-band right-handed circularly polarized feed antenna each have four metal layers, which are a feed microstrip circuit layer, a feed metal ground plane layer, a first feed notched circular patch layer, and a second feed notched circular patch layer from bottom to top.

4. The dual-frequency and dual-circularly-polarized transmit-array antenna with independently controllable beams according to claim 3, wherein the feed microstrip feed circuit layer comprises one input port and four output ports formed by connection of the microstrip lines, and a −90-degree phase difference required for left-handed circular polarization or a 90-degree phase difference required for right-handed circular polarization is formed between the four output ports; the feed metal ground plane layer is provided with four gaps rotating 90 degrees in sequence and having the same shape; and the first feed notched circular patch layer and the second feed notched circular patch layer are each provided with four notched circular patches rotating 90 degrees in sequence.

5. The dual-frequency and dual-circularly-polarized transmit-array antenna with independently controllable beams according to claim 3, wherein the first feed notched circular patch layer and the second feed notched circular patch layer are provided with one of a notched circular patch and a notched rectangular patch; and the four gaps on the feed metal ground plane layer are in any one of a straight line shape, an H shape, a cross shape, a Z shape, and an oval shape.

6. The dual-frequency and dual-circularly-polarized transmit-array antenna with independently controllable beams according to claim 3, wherein the planar broadband circularly polarized feed array further comprises three substrate layers, the three substrate layers being respectively a first feed substrate layer, a second feed substrate layer, and a third feed substrate layer;
the feed microstrip feed circuit layer being disposed below the first feed substrate layer, the feed metal ground plane layer being disposed above the first feed substrate layer, the first feed notched circular patch layer being disposed above the second feed substrate layer, and the first feed notched circular patch layer being disposed below the third feed substrate layer.

7. The dual-frequency and dual-circularly-polarized transmit-array antenna with independently controllable beams according to claim 6, wherein the planar broadband circularly polarized feed array further comprises a feed adhesive layer and a feed air layer, the feed adhesive layer being disposed between the first feed substrate layer and the second feed substrate layer, and the feed adhesive layer or the feed air layer being disposed between the second feed substrate layer and the third feed substrate layer.

8. The dual-frequency and dual-circularly-polarized transmit-array antenna with independently controllable beams according to claim 1, wherein the planar transmit-array comprises a plurality of K-band dual-circularly-polarized phase shifting cells and a plurality of Ka-band dual-circularly-polarized phase shifting cells that are periodically staggered in a shared-aperture manner.

9. The dual-frequency and dual-circularly-polarized transmit-array antenna with independently controllable beams according to claim 8, wherein the K-band dual-circularly-polarized phase shifting cells are two-dimensionally periodically arranged on the vertices of square grids with a side length of a K-band period length, and the Ka-band dual-circularly-polarized phase shifting cells are two-dimensionally periodically arranged on center points of square grids with a side length of the K-band period length; and the period length of the K-band dual-circularly-polarized phase shifting cell is 0.3 to 0.5 K-band wavelength, and the period length of the Ka-band dual-circularly-polarized phase shifting cell 8 is 0.5 to 0.8 Ka-band wavelength.

10. The dual-frequency and dual-circularly-polarized transmit-array antenna with independently controllable beams according to claim 8, wherein the K-band dual-circularly-polarized phase shifting cell and the Ka-band dual-circularly-polarized phase shifting cell each comprise a receiving antenna, a phase shifting stripline, and a transmitting antenna, the receiving antenna and the transmitting antenna being connected via the phase shifting stripline.

11. The dual-frequency and dual-circularly-polarized transmit-array antenna with independently controllable beams according to claim 8, wherein the K-band dual-circularly-polarized phase shifting cell and the Ka-band dual-circularly-polarized phase shifting cell both employ a manner of x-linearly polarized receiving and y-linearly polarized transmit, or y-linearly polarized receiving and x-linearly polarized transmit, phase shifting degrees in x-linearly polarized receiving and y-linearly polarized transmit, and y-linearly polarized receiving and x-linearly polarized transmit being consistent.

12. The dual-frequency and dual-circularly-polarized transmit-array antenna with independently controllable beams according to claim 10, wherein the K-band dual-circularly-polarized phase shifting cell comprises several metal layers disposed from bottom to top, the metal layers forming the receiving antenna, the phase shifting stripline, and the transmitting antenna of the K-band dual-circularly-polarized phase shifting cell; and
by setting a phase shifting degree of the metal layer for the phase shifting stripline of the K-band dual-circularly-polarized phase shifting cell, linearly polarized transmit phases corresponding to four K-band dual-circularly-polarized phase shifting cells in the planar transmit-array are set to have a 45-degree difference between adjacent cells.

13. The dual-frequency and dual-circularly-polarized transmit-array antenna with independently controllable beams according to claim 12, wherein the K-band dual-circularly-polarized phase shifting cell comprises a K-band first metal layer, a K-band fourth metal layer, a K-band fifth metal layer, a K-band sixth metal layer, a K-band seventh metal layer, a K-band eighth metal layer, and a K-band eleventh metal layer that are disposed from bottom to top; and
several K-band metal vias are arranged to respectively connect the K-band fourth metal layer to the K-band sixth metal layer, the K-band fifth metal layer to the K-band seventh metal layer, and the K-band sixth metal layer to the K-band eighth metal layer.

14. The dual-frequency and dual-circularly-polarized transmit-array antenna with independently controllable beams according to claim 13, wherein the K-band first metal layer and the K-band eleventh metal layer of the K-band dual-circularly-polarized phase shifting cell each are disposed in one of a notched circular patch and a notched rectangular patch.

15. The dual-frequency and dual-circularly-polarized transmit-array antenna with independently controllable beams according to claim 13, wherein the K-band first metal layer and the K-band eleventh metal layer are each a circular patch provided with ±45 degree notches, the K-band fourth metal layer and the K-band eighth metal layer are each orthogonal L-shaped microstrip lines, the K-band fifth metal layer and the K-band seventh metal layer are each a metal ground plane provided with two circular holes, and the K-band sixth metal layer is formed by two phase shifting striplines.

16. The dual-frequency and dual-circularly-polarized transmit-array antenna with independently controllable beams according to claim 10, wherein the Ka-band dual-circularly-polarized phase shifting cell comprises several metal layers, the metal layers forming the receiving antenna, the phase shifting stripline, and the transmitting antenna of the Ka-band dual-circularly-polarized phase shifting cell; and
by setting a phase shifting degree of the metal layer for the phase shifting stripline of the Ka-band dual-circularly-polarized phase shifting cell, linearly polarized transmit phases corresponding to four Ka-band dual-circularly-polarized phase shifting cells in the planar transmit-array are set to have a 45-degree difference between adjacent cells.

17. The dual-frequency and dual-circularly-polarized transmit-array antenna with independently controllable beams according to claim 16, wherein the Ka-band dual-circularly-polarized phase shifting cell comprises a Ka-band first metal layer, a Ka-band third metal layer, a Ka-band fourth metal layer, a Ka-band fifth metal layer, a Ka-band sixth metal layer, a Ka-band seventh metal layer, and a Ka-band ninth metal layer that are disposed from bottom to top; and
several Ka-band metal vias are arranged to respectively connect the Ka-band third metal layer to the Ka-band fifth metal layer, the Ka-band fourth metal layer to the Ka-band sixth metal layer, and the Ka-band fifth metal layer to the Ka-band seventh metal layer.

18. The dual-frequency and dual-circularly-polarized transmit-array antenna with independently controllable beams according to claim 16, wherein the Ka-band first metal layer and the Ka-band ninth metal layer of the Ka-band dual-circularly-polarized phase shifting cell each are disposed in one of a notched circular patch and a notched rectangular patch.

19. The dual-frequency and dual-circularly-polarized transmit-array antenna with independently controllable beams according to claim 16, wherein the Ka-band first metal layer and the Ka-band ninth metal layer are each a circular patch provided with ±45 degree notches, the Ka-band third metal layer and the Ka-band seventh metal layer are each orthogonal L-shaped microstrip lines, the Ka-band fourth metal layer and the Ka-band sixth metal layer are each a metal ground plane provided with two circular holes, and the Ka-band fifth metal layer is formed by two phase shifting striplines.

20. The dual-frequency and dual-circularly-polarized transmit-array antenna with independently controllable beams according to claim 12, wherein the planar transmit-array comprises several substrate layers and adhesive layers, the adhesive layer being disposed between adjacent substrate layers, and each metal layer being disposed above or below the substrate layer in a stacked patch form.

21. The dual-frequency and dual-circularly-polarized transmit-array antenna with independently controllable beams according to claim 1, wherein the planar broadband circularly polarized feed array is placed near a focal plane of the planar transmit-array in a vertical distance from the planar transmit-array of F, and the planar transmit-array has a diameter of D, wherein $0.3 \leq F/D \leq 1.5$.

* * * * *